United States Patent [19]

Stannard et al.

[11] 4,340,478
[45] Jul. 20, 1982

[54] FILTER MEDIA AND FILTER APPARATUS

[75] Inventors: Forrest B. Stannard, Ft. Lauderdale; Edward J. Highstreet, Coral Springs, both of Fla.

[73] Assignee: The DeHydro Corporation, Charlotte, N.C.

[21] Appl. No.: 294,039

[22] Filed: Aug. 18, 1981

[51] Int. Cl.³ ................. B01D 23/02; B01D 39/14
[52] U.S. Cl. ................................ 210/286; 210/293; 210/496; 210/510
[58] Field of Search ............... 210/232, 238, 271, 272, 210/273, 277, 279, 284, 285, 286, 287, 289, 293, 455, 510, 503, 504, 506, 483, 496

[56] References Cited

U.S. PATENT DOCUMENTS

| | | | |
|---|---|---|---|
| 1,277,832 | 9/1918 | Beckley | 210/293 |
| 1,783,466 | 12/1930 | Friend | 210/286 |
| 3,202,286 | 8/1965 | Smit | 210/286 |
| 3,847,808 | 11/1974 | Spohr | 210/286 |
| 3,867,292 | 2/1975 | Cornell | 210/293 |
| 4,013,566 | 3/1977 | Taylor | 210/510 |
| 4,208,288 | 6/1980 | Stannard et al. | 210/277 |

*Primary Examiner*—Ernest G. Therkorn
*Attorney, Agent, or Firm*—Carroll F. Palmer

[57] ABSTRACT

Filter media comprises a grid of parallelogram openings formed by a first series of parallel strips and a second series of parallel strips narrower than the first series strips fixed together normal to each other. The grid openings are filled with rigid porous filter material formed of crushed anthracite or other solid particles held in a matrix of cured resin presenting a flat upper surface together with the upper edges of the first and second series strips.

Filter apparatus are formed by placing the filter media in an open-top tank on or above the floor of the tank and providing one or more conduits in the tank through which liquid contained in the tank below the level of said filter material can be withdrawn from the tank.

13 Claims, 16 Drawing Figures

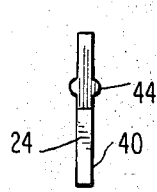
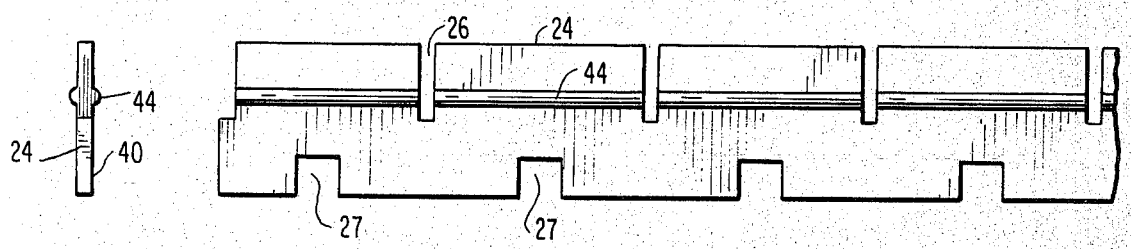
FIG. 6    FIG. 5
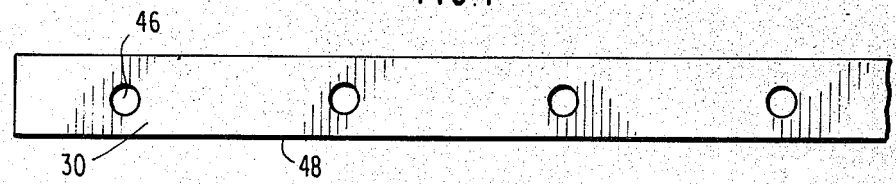
FIG. 8    FIG. 7
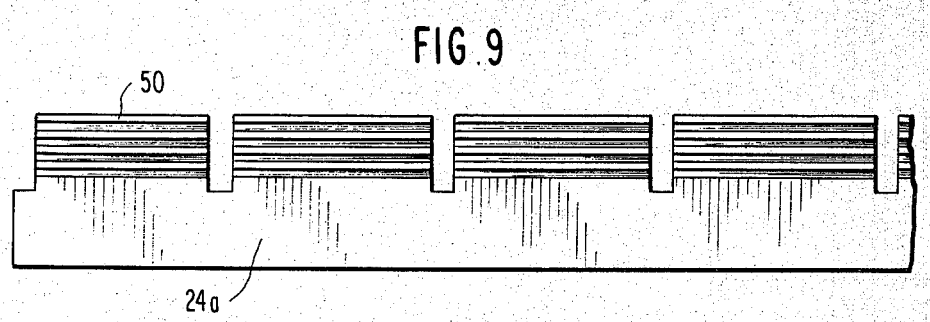
FIG. 10    FIG. 9
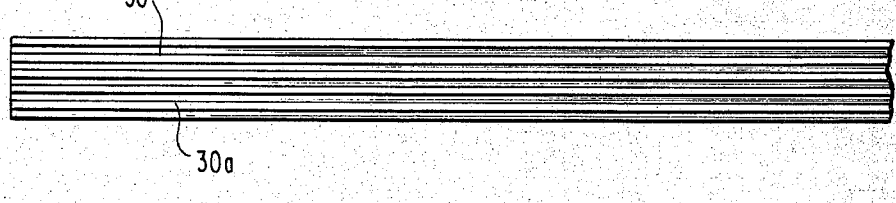
FIG. 12    FIG. 11

FILTER MEDIA AND FILTER APPARATUS

BACKGROUND OF THE INVENTION

1. Field of the Invention

The invention broadly relates to filter media and filter apparatus comprising such filter media. More particularly it concerns rigid filter media capable of withstanding heavy loads upon the top surface and that is well suited for use in dewatering sewage sludge.

2. Description of Prior Art

In the operation of a sewage treatment plant it is necessary to dewater sewage sludge as a step in disposing of it. In conventional operations, the sludge influent to the dewatering step will contain not over about 2% solids. In order to handle the sludge as a "dry" product in trucks for hauling to a disposal site, the sludge should contain at least about 8% solids.

The typical equipment for sludge dewatering is an open tank containing a bed of loose sand supported on a lower bed of gravel which in turn is supported upon the floor of the tank, usually made of concrete. The dewatered sludge builds up on the top of the sand layer as water drains through until the sludge layer contains about 6% solids. At such point, cracks start to occur in the layer and these grow as more water is removed. Depending upon the amount of time the sludge charge is allowed to remain in the tank, it can be dewatered up to 12–15% solids. At any point above about 6–8% solids content, the sludge is removed from the sand bed by shovels, back-hoes or other scraping or scooping equipment. Usually a thin layer of sludge will remain on the top of the sand bed and will hinder the dewatering of the next batch of influent. Rakes or scrapers are often used to remove this sludge residue, but this can result in loss of sand eventually requiring replacement of the sand bed. Furthermore, this sand bed type sludge dewatering is undesirably slow and requires large area filters to attain needed throughput.

Another conventional method of dewatering sludge uses contrifuges. This presents problems as to initial equipment costs and maintenance expenses.

Another type of sludge dewatering apparatus has used a rigid bed or plate of solid particles bound in a matrix of cured resin in place of the conventional sand bed. Plates of this type are discussed in our prior U.S. Pat. No. 4,208,288, the disclosure of which is incorporated herein by reference.

OBJECTS

A principal object of this invention is the provision of new forms of rigid filter media and new filter apparatus comprising such filter media.

Further objects include the provision of:

(1) New filter media paticularly useful for the dewatering of sewage sludge.

(2) Rigid filter media strong enough to support the weight of power driven scraping equipment for removal of dewatered sludged.

(3) Such rigid filter media that enables a relatively high vacuum to be applied through it to improve filtration rate.

(4) Rigid filter media that is highly resistant to corrosion and damage by contact with sewage sludge and similar aqueous suspensions.

(5) New filter media from which dewatered sewage sludge may be more effectively removed than with conventional sand bed filter media.

(6) New filter apparatus that is highly effective for the dewatering of sewage sludge.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are, in part, accomplished according to the present invention by improved filter media which is in the form of a grid of parallelogram openings defined by a first series of parallel rigid strips and a second series of parallel strips narrower than the first series strips fixed together normal to each other. The grid openings are filled with rigid porous filter material consisting essentially of solid particles held in a matrix of cured resin presenting a flat upper surface, together with the top edges of the first and second series strips, on the filter media.

Advantageously, the first series strips have slots in their top edges the size of the cross-section of the second series strips which are fixed in such slots by cement, adhesive, press fit or by tabs, burrs or the like. Holes or serrations are used in the preferred embodiments to help anchor the filter material filling the grid openings to the rigid strips. Wire cloth, synthetic or glass fibers and similar elements may be included in the filter material to strengthen or reinforce it.

The depth of the filter material filling the grid openings is at least equal to the width of the second series strips, but is substantially less than the width of the first series strips. This leaves open space between the bottom of the filter material and the top of a surface upon which the filter media rests, e.g., the floor of a tank.

In preferred embodiments the grid openings are squares with sides about 2 to 5 centimeters in length, the solid particles of the filter material are anthracite particles between about 10 to 18 mesh size and the resin forming the binder matrix is cured epoxy resin.

The objects are further accomplished according to the invention by the provision of filter apparatus comprising the new filter media and also, preferably, comprising means to create a vacuum in the apparatus beneath the filter material filling the grid openings in the filter media. Advantageously, such apparatus includes an open-top tank in which a section of the filter media the size of the tank opening is positioned in contact with the bottom of the tank or suspended a short distance above the bottom, and the edges of the filter media section are sealed to the walls of the tank. The tanks in such apparatus may be round, square, rectangular or any other desired shape. Special arrangements of sloped grooves, gutters or the like may be included in the tank bottoms in order to increase speed of removal of the effluent from the filter apparatus.

BRIEF DESCRIPTION OF THE DRAWINGS

A more complete understanding of the invention may be had by reference to the accompanying drawings in which:

FIG. 5 is a fragmentary, side view of a first series rigid strip of which filter media of the invention are formed.

FIG. 6 is an end view of the strip of FIG. 5.

FIG. 7 is a fragmentary, side view of a second series rigid strip used in the invention.

FIG. 8 is an end view of the strip of FIG. 7.

FIG. 9 is a fragmentary, side view of another form of first series rigid strips of the invention.

FIG. 10 is an end view of the strips shown in FIG. 9.

FIG. 11 is a fragmentary, side view of another form of second series rigid strips of the invention.

FIG. 12 is an end view of the strips shown in FIG. 11.

DESCRIPTION OF PREFERRED EMBODIMENTS

Figure 1:
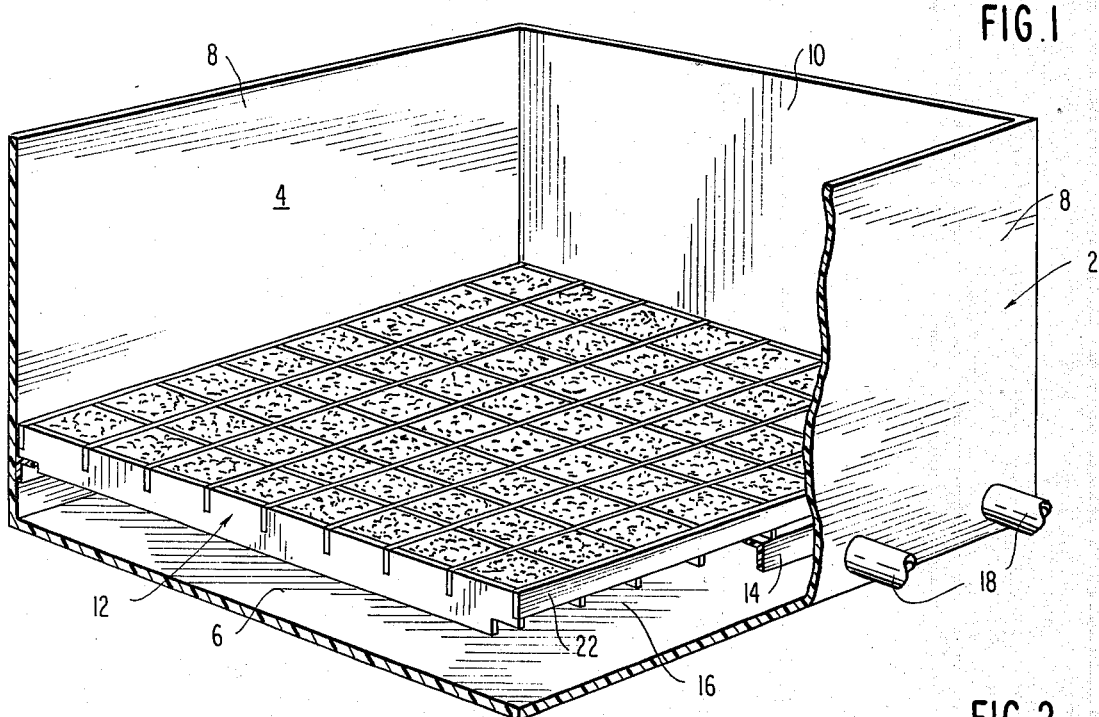
FIG. 1 is an isometric view, partially broken away, of filter apparatus constructed in accordance with the invention.

Referring in detail to the drawings filter apparatus 2 comprises a tank 4 having a bottom or floor 6, side walls 8 and an open top 10. A section of filter media 12 is supported on brackets 14 above the tank bottom 6 creating a fluid drain space 16. Conduit means 18 extend through one or more walls 8 of tank 4 through which liquid beneath the filter media 12 may be withdrawn and/or vacuum from a source (not shown) may be applied to the filter media 12. Sealing material 20 may be used to provide fluid tight joints between the edges 22 of media 12 and the inner surfaces of the walls 8.

In the filter apparatus 2a the filter media section 12 rests directly on the tank bottom 6, but a fluid space 16a still exists in the apparatus because of the structure of filter media 12 as will be discussed in detail below. Conduit means 18a extend through the floor of the tank 2a.

Figure 4:
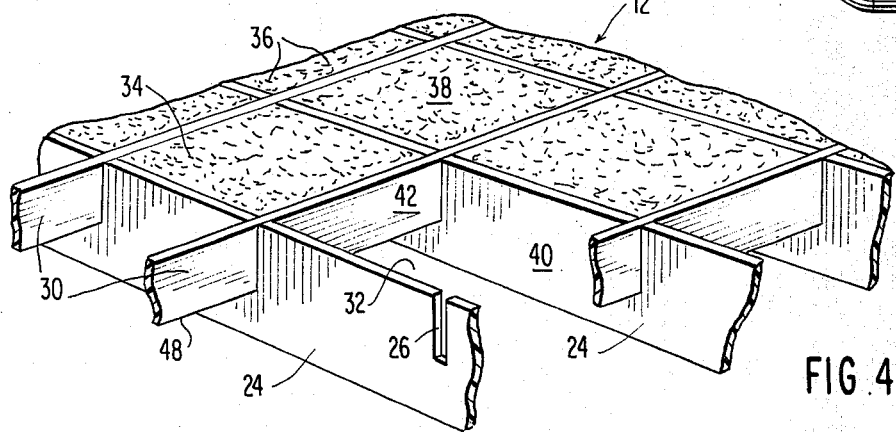
FIG. 4 is a fragmentary, isometric view of a portion of one form of filter media of the invention.

With particular reference to FIG. 4, the filter media 12 comprises a first series of parallel, elongated strips 24, all of which have substantially equal transverse dimensions, i.e., equal heights. There are a multiplicity of slots 26 in each strip 24 extending from the top edges thereof part way into the strips 24 normal to the longitudinal axis of the strip. All the slots 26 in all the strips 24 are preferably of the same size and identically spaced along the length of the strips 24. The strips 24 may also have lower slots 27 that serve as lateral drain openings for the drain space 16.

The filter media 12 also comprises a second series of parallel, elongated rigid strips 30 having a cross-section substantially equal to the slots 26 fixed in the slots normal to the strips 24 forming a grid of parallelogram openings 32.

The openings 32 are all filled with rigid, porous filter material 34 made of solid particles 36 held in a matrix of cured resin. The filter material 34 together with the strips 24 and 30 present a substantially flat upper surface 38 on the filter media 12. The depth of the filter material is at least equal to the depth of the slots 26, but substantially less than the transverse dimension of the strips 24.

The strips 24 and 30 can be made of the same or different rigid material. Plastic, particularly polyvinyl chloride plastic, is preferred, but any other material can be used to form the strips, e.g., stainless steel or other metal, glass-fiber reinforced plastic, wood or the like. The strips 30 may be fixed in the slots 26 in any suitable manner, e.g., by use of cement, by welding, by press-fitting, by use of barbs (not shown), etc.

The vertical sides 40 of strips 24 and sides 42 of strips 30 may be completely flat. However, in order to assist in holding the filter material 34 in the openings 32, it is advantageous to provide longitudinal ribs 44 on the sides 40 of strips 24 and to have a series of spaced apart holes 46 in the strips 30.

To produce the filter media 12, a quantity of solid particles 36 are mixed with liquid, uncured resin to form a trowelable mass and this is charged into the openings 32 which are temporarily backed-up at their base by a board or sheet so that the trowelable mass will not fall out the openings, but will be held in them to a depth preferably slightly below the bottom edges 48 of strips 30. The top surface of the charged mass is then trowelled so as to produce a smooth surface 38. The resulting structure is then allowed to sit until the resin in the mass completely cures and the filter material 34 becomes completely hard and rigid.

The preferred solid particles 36 for use in the invention is crushed anthracite between about 5 to 35 mesh (standard screen) and especially between 10 and 18 mesh, but other solid particles may be used, e.g., coke, activated carbon, crushed stone, porous ceramic, sand, etc. The solid particles advantageously constitute 50–95% by weight of the filter material 34. The organic resin used for the matrix is epoxy resin, but other resins capable of conversion to a cured condition upon suitable admixture may be used, e.g., phenol-aldehyde resins, urea-aldehyde resins and equivalent curable resins.

It is important for the success of the invention that the filter material 34 be firmly retained in the grid openings 32. It has been indicated that ribs 44 on strips 24 and holes 46 in strips 30 into which portions of the filter material 34 may extend can be used for this purpose. Another way to assist retention of the filter material in the grid is to have serrations 50 in the sides of the strips 24a and 30a. These may be used together with the ribs 44 and holes 46 or alone as means to anchor the filter material 34 in the grid openings 32.

The grid openings 32 are preferrably squares with sides between about 2 to 5 centimeters in length. However, they may be rectangular or other shapes, e.g., they may be triangular where the filter media 12 is circular in shape and the strips 24 or 30 are curved parallel rather than straight.

Figure 3:
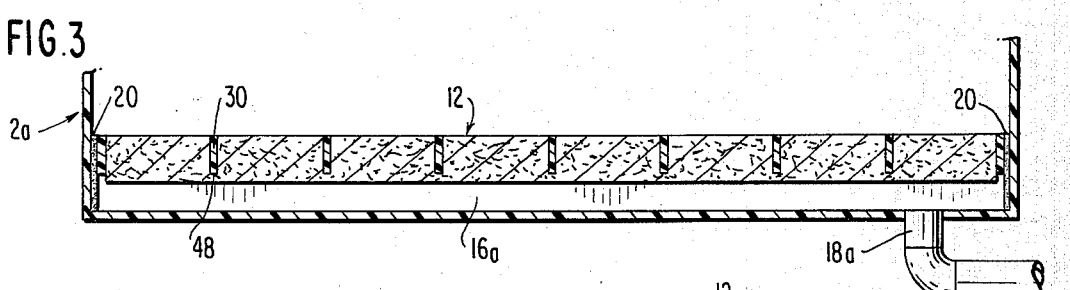
FIG. 3 is a sectional view showing another form of filter apparatus of the invention.

Noteworthy advantages of the new filter media include their ability to support great weight on their top surface and to have such surface scraped or scrubbed without detriment. Hence, it is possible to remove dewatered sewage sludge from filter apparatus comprising the new filter media by driving bulldozers, back-hoes and like scraping and loading machinery right onto the top surface of the filter media. To attain the greatest top surface supporting strength in the new filter apparatus it is preferrable to have the filter media 12 rest directly on the bottom of a tank, e.g., see FIG. 3. In order to improve the flow rate of filtered effluent from the filter apparatus, it is advantageous to provide sloping gutters, grooves or the like in the bottoms of the tanks comprising such apparatus. Example of such arrangements are shown in FIGS. 13-16.

Figure 13:
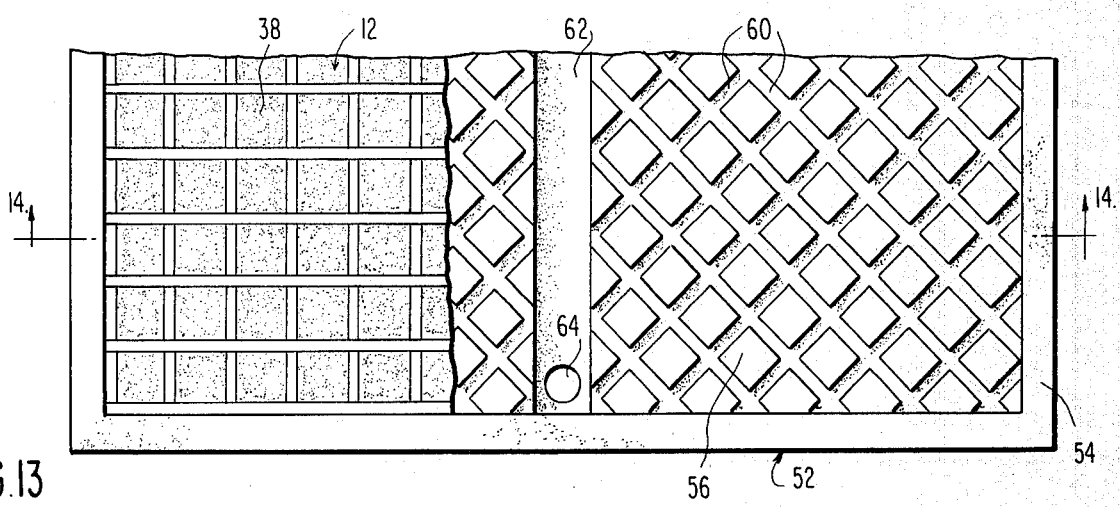
FIG. 13 is a fragmentary, plan view of another form of filter apparatus of the invention.
Figure 14:
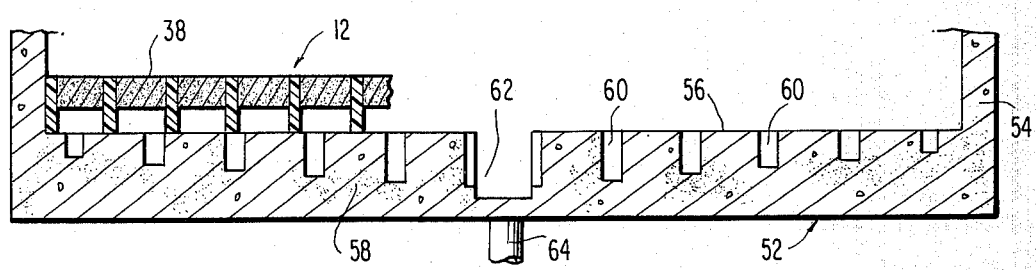
FIG. 14 is a sectional view taken on the line 14—14 of FIG. 13.

FIGS. 13 and 14 illustrate filter apparatus 52 comprising a tank 54 in which the filter media 12 rests directly on the top surface 56 of the tank bottom 58 that contains a criss-cross pattern of effluent drain slots 60. Each slot 60 in the pattern slopes downwardly from the outer edges of the tank 54 toward the central drain gutter 62. Thus, although the top surface 38 of filter media 12 is level allowing for even distribution of influent over the entire area of the tank, there is a flow gradient for filtered effluent along the slots 60 toward the gutter 62. In this way, filtered effluent can flow to the gutter 62 and then out the discharge conduit 64.

Figure 15:
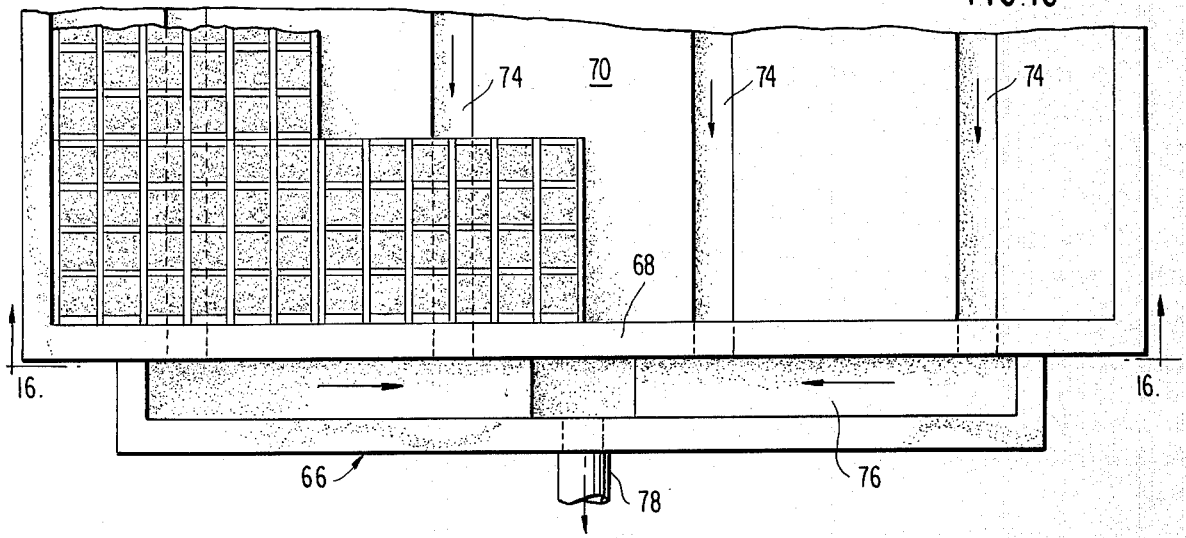
FIG. 15 is a fragmentary, plan view of yet another form of filter apparatus of the invention.
Figure 16:
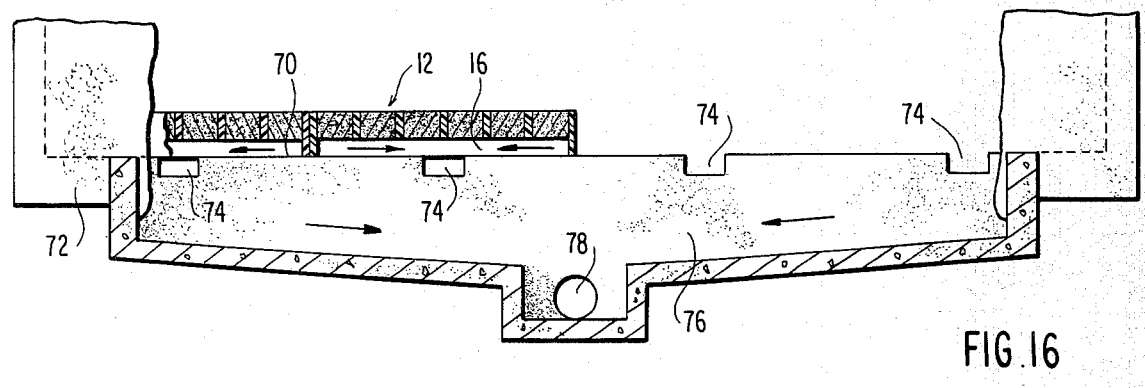
FIG. 16 is a fragmentary, sectional view taken on the line 16—16 of FIG. 15.

FIGS. 15 and 16 show another drainage arrangement for filter apparatus of the invention. The filter apparatus 66 comprises a tank 68 in which the filter media 12 rests directly on the top surface 70 of the tank bottom 72 that contains a series of underdrain gutters 74. These gutters slope downwardly in the direction of the arrows in FIG. 15 and discharge at their lowest point into the sluiceway 76. Hence, there is a flow gradient for effluent that passes through the filter media 12 via the space 16 beneath media 12, thence via gutters 74 and sluiceway 76 to the discharge conduit 78.

Figure 2:
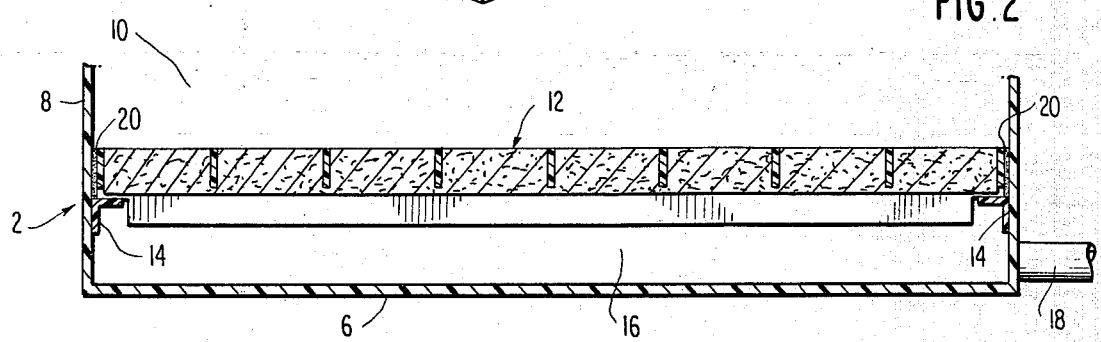
FIG. 2 is a sectional view taken on the line 2—2 of FIG. 1.

Instead of being supported on brackets as shown in FIGS. 1 and 2, or directly on the bottoms of tanks as described, the filter media 12 may be supported upon beds of sand, gravel or the like. The filter media 12 comprising filter apparatus of the invention may be one continuous unit. Alternatively, the filter media may be in the form of modules, e.g., 4'×4' sections, 2'×4' sections, 4'×8' sections, etc., positioned side-by-side. The abutting edges of the modules in such an assembly may be fixed together such as by adhesive, cement, etc., or the modules may be unfixed to one another. In the latter case, gaskets, sealants or the like may be employed to seal the joints between the abutting edges of the separate modules.

Although the new filter media of the invention are particularly useful as components for filter apparatus to be used in dewatering sewage sludge in flat, open tanks, such media can be successfully used in many other types of filter apparatus and methods where strong, rigid filter media is needed.

The embodiments of the invention in which an exclusive property or privilege is claimed are defined as follows:

1. A filter media comprising:
   a first series of parallel, elongated rigid strips, each strip in said series having substantially equal transverse dimensions and having a multiplicity of slots extending from the top edge thereof part way into the strip normal to the longitudinal axis of the strip, all said slots in all said strips being of substantially the same width and depth,
   a second series of parallel, elongated rigid strips having a cross-section substantially equal to said slots fixed in said slots normal to said first series of strips forming a grid of parallelogram openings,
   said grid openings all being filled with rigid, porous filter material consisting essentially of solid particles held in a matrix of cured resin, said filter material together with said first and second series of strips presenting a substantially flat upper surface on said filter media,
   the depth of said filter material being at least equal to the depth of said slots but substantially less than the transverse dimension of said first series strips.

2. A filter media according to claim 1 wherein said rigid strips are made of plastic.

3. The filter media of claim 2 wherein said plastic is polyvinyl chloride.

4. A filter media according to claim 1 wherein said first series strips have a rib extending longitudinally along both sides thereof.

5. A filter media according to claim 1 wherein said second series of strips each have a spaced apart series of holes extending therethrough into which a portion of said filter material extends serving to lock the filter material into said grid.

6. A filter media according to claim 1 wherein at least some of said strips have longitudinal serrations on the sides thereof.

7. Filter media according to claim 1 wherein said solid particles of said filter material are anthracite of between about 10 to 18 mesh size.

8. Filter media of claim 7 wherein said resin is epoxy resin.

9. Filter media according to claim 1 wherein said grid openings are substantially square openings with sides between about 2 to 5 cms. in length.

10. Filter apparatus comprising a tank formed of a bottom, side walls and an open top, filter media as defined in claim 1 positioned in said tank and conduit means connected to said tank for withdrawing liquid contained in said tank between said bottom and said filter media from said tank.

11. Filter apparatus according to claim 10 wherein said filter media is sealed at its edges to the sides of said tank.

12. Filter apparatus according to claim 10 wherein the bottom edges of said first series strips rest on the top surface of said tank bottom.

13. Filter apparatus according to claim 10 wherein said filter media is supported at the edges thereof above said tank bottom upon brackets fixed to said tank walls.

* * * * *